US012691991B2

(12) United States Patent
Gabrys et al.

(10) Patent No.: US 12,691,991 B2
(45) Date of Patent: Jul. 28, 2026

(54) STRUCTURAL SHAPE MODE INFLUENCERS

(71) Applicant: The Boeing Company, Arlington, VA (US)

(72) Inventors: Jonathan Wayne Gabrys, Downingtown, PA (US); Megan E. Prucnal, Wallingford, PA (US); Angela Santo, Philadelphia, PA (US)

(73) Assignee: The Boeing Company, Arlington, VA (US)

( * ) Notice: Subject to any disclaimer, the term of this patent is extended or adjusted under 35 U.S.C. 154(b) by 465 days.

(21) Appl. No.: 18/347,042

(22) Filed: Jul. 5, 2023

(65) Prior Publication Data

US 2025/0010972 A1      Jan. 9, 2025

(51) Int. Cl.
B62D 21/15      (2006.01)
B64C 1/06      (2006.01)

(52) U.S. Cl.
CPC .............. B64C 1/062 (2013.01); B62D 21/15 (2013.01)

(58) Field of Classification Search
CPC ................................. B62D 21/15; B64C 1/062
See application file for complete search history.

(56) References Cited

U.S. PATENT DOCUMENTS

| | | | | |
|---|---|---|---|---|
| 4,452,657 A | * | 6/1984 | Hamm ................. | B29D 24/008 52/630 |
| 4,593,870 A | * | 6/1986 | Cronkhite ............... | B64C 1/062 244/119 |
| 4,988,232 A | * | 1/1991 | Mason ...................... | E04C 3/40 403/402 |
| 5,069,318 A | * | 12/1991 | Kulesha ................ | B64C 27/006 188/377 |
| 5,310,137 A | * | 5/1994 | Yoerkie, Jr. ........... | B64C 27/001 244/17.11 |
| 5,451,015 A | * | 9/1995 | Cronkhite .............. | B64D 37/02 244/119 |
| 7,198,224 B2 | * | 4/2007 | Townsend ............. | B64C 27/006 244/119 |
| 7,607,273 B2 | * | 10/2009 | Henderson ............ | E04B 1/2403 403/313 |
| 7,780,116 B2 | * | 8/2010 | Payen ..................... | B64C 1/065 244/119 |
| 9,086,110 B2 | * | 7/2015 | Guimard ................. | B64C 1/062 |
| 9,688,381 B2 | * | 6/2017 | Fink ........................ | B64C 1/062 |
| 10,745,098 B2 | * | 8/2020 | Ludin ....................... | E04C 3/02 |
| 11,873,111 B2 | * | 1/2024 | Carr ........................ | B60L 50/71 |

* cited by examiner

*Primary Examiner* — Aaron L Lembo
(74) *Attorney, Agent, or Firm* — Hanley, Flight & Zimmerman, LLC

(57)      ABSTRACT

Structural shape mode influencers are disclosed. An example apparatus to introduce a pre-defined buckling mode in a beam for energy absorption in a vehicle includes a body of the beam, the body extending along a lateral direction thereof between a first lateral side of the beam and a second lateral side of the beam, and a stiffener interstitially placed in the body, the stiffener positioned between the first and second lateral sides, the stiffener extending across at least a portion of a longitudinal direction of the body.

20 Claims, 8 Drawing Sheets

STRUCTURAL SHAPE MODE INFLUENCERS

FIELD OF THE DISCLOSURE

This disclosure relates generally to structures and, more particularly, to structural shape mode influencers.

BACKGROUND

Typically, aircraft and other vehicles can be subject to significant loads. For example, rotorcraft can experience significant loads during hard landings and, thus, can necessitate components with increased strength and weight to mitigate these loads. Further, the loads encountered during hard landings of a rotorcraft can translate to occupants in a cabin of the rotorcraft.

SUMMARY

An example apparatus to introduce a predefined buckling mode in a beam for energy absorption in a vehicle includes a body of a beam, the body extending along a lateral direction thereof between a first lateral side of the beam and a second lateral side of the beam, and a stiffener interstitially placed in the body, the stiffener positioned between the first and second lateral sides, the stiffener extending across at least a portion of a longitudinal direction of the body.

An example support platform for use with a vehicle includes a first frame portion, a second frame portion, a beam extending between the first and second frame portions, and a stiffener integral with a wall of the beam, the stiffener extending across at least a portion of a longitudinal length of the wall to introduce a predefined buckling mode in the beam.

An example method to introduce a pre-defined buckling mode in a beam for energy absorption includes defining or placing a stiffener into or onto a body of the beam, the stiffener extending across at least a portion of a longitudinal length of the body, and positioning the body to laterally extend between at least one of (i) a first flange and a second flange, or (ii) a first frame portion and a second frame portion.

Figure 1:
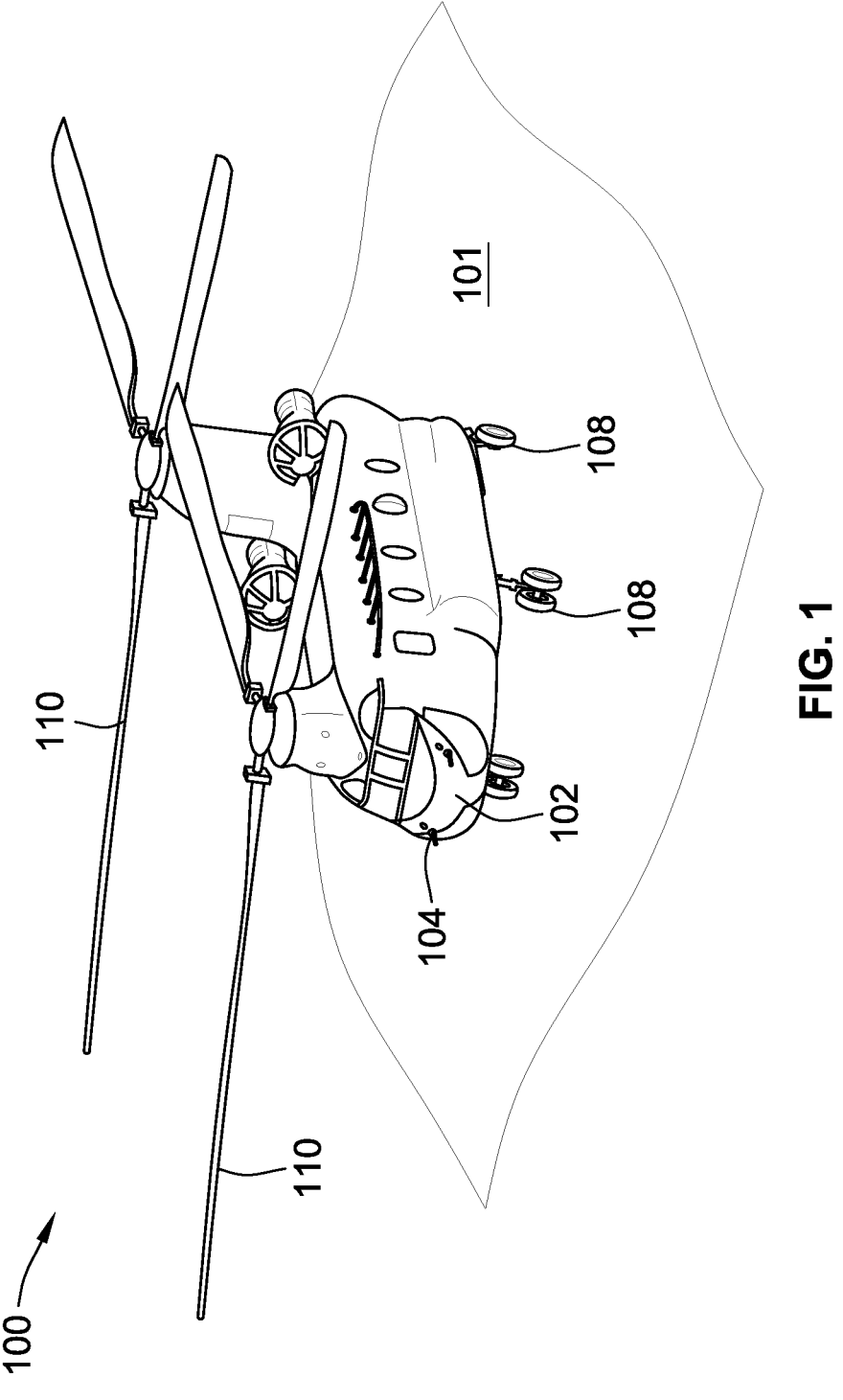
FIG. 1 is an aircraft in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the terms "interstitial" and "interstitially" refer to a body and/or component that is rigidly placed in and/or embedded in another object. As used herein, the term "stiffener" refers to a region of a body that has a greater stiffness than at least one other region of the body. As used herein, the term "integral with" refers to a first component being embedded within, rigidly placed into, or rigidly placed on onto a second component.

DETAILED DESCRIPTION

Structural shape mode influencers are disclosed. Typically, aircraft and other vehicles can be subject to significant loads. For example, rotorcraft can experience significant loads during landing and, thus, can necessitate components with increased strength and weight to mitigate those loads. Further, the loads encountered during landing of a rotorcraft can translate to occupants in a cabin of the rotorcraft.

Examples disclosed herein enable effective dissipation and/or absorption of forces/energy that can be imparted to components and/or occupants of a vehicle (or stationary structure). Examples disclosed herein can also be implemented to control oscillatory displacements caused by input forces. Further, examples disclosed herein can be produced in a cost-effective and relatively quick manner.

Examples disclosed herein can introduce a predefined buckling mode in a beam for effective energy dissipation by selectively and/or locally stiffening a body of the beam that extends between a first flange and a second flange. In particular, a stiffener interstitially and/or embedded in the body is positioned between the first and second flanges, such that the stiffener extends across at least a portion of a longitudinal length of the body. By defining areas on the body with different degrees of stiffness and/or rigidity, examples disclosed herein can significantly dissipate forces and/or energy provided to the beam and/or the body while remaining relatively lightweight. Additionally or alternatively, examples disclosed herein can control modal behavior and/or displacements of the body.

In some examples, the stiffener includes a pattern (e.g., a regular pattern) or scattered distribution of interstitial bodies embedded in the body. In such examples, the interstitial bodies can extend across a portion of the aforementioned longitudinal length of the body. In some examples, the body is composed of a different material and/or material composition from that of the stiffener. Alternatively, the body is composed of an identical material to that of the stiffener (e.g., the body is integral with the stiffener). In some such examples, the stiffener includes a different width, depth and/or thickness from that of the body, thereby defining a portion and/or region having a different stiffness and/or rigidity. In some examples, the stiffener is placed between first and second lateral portions of the body, thereby dividing the body into separate portions (e.g., separate non-contiguous portions). In particular, the stiffener can divide the body into the first and second lateral body portions, for example. Alternatively, in some examples, the stiffener is placed between first and second longitudinal portions of the body, thereby dividing the body into separate portions (e.g., separate non-contiguous portions). In particular, the stiffener can divide the body into the first and second longitudinal body portions, for example.

FIG. 1 is an aircraft 100 in which examples disclosed herein can be implemented. In the illustrated view of FIG. 1, the aircraft 100 is implemented as a rotorcraft and depicted landing on the ground 101. As can be seen in FIG. 1, the aircraft 100 has a fuselage 102 that defines a cabin 104, landing struts 108 and rotors 110. The aircraft 100 can be manned or unmanned.

In operation, the rotors 110 are operated to direct motion of the aircraft 100. Further, the rotors 110 are controlled during a hovering operation. Accordingly, the aircraft 100 can be directed to land while hovering. However, during landing, an impact of the landing struts 108 with the ground 101 can result in relatively significant forces translated into the cabin 104 such that vertical forces (in the view of FIG. 1) can, in turn, be translated into the cabin 104. As a result, occupants in the cabin 104 can experience these forces.

Examples disclosed herein can be implemented to reduce forces translated and/or transferred into the cabin 104 and, in turn, encountered by the aforementioned occupants in the cabin 104. Examples disclosed herein can be implemented in panels and/or frame structure associated with the cabin 104 to effectively dissipate energy and/or forces translated throughout the aircraft 100 and/or the cabin 104.

While the aircraft 100 is shown in FIG. 1, examples disclosed herein can be applied to any appropriate structure and/or application. Examples disclosed herein can be applied to any appropriate location and/or structure of the aircraft 100. Further, examples can be implemented with any other type of appropriate vehicle (e.g., fixed wing aircraft, watercraft, submarines, spacecraft, unmanned vehicles, etc.) or stationary structure (e.g., a building, a platform, a housing structure, a support beam, a building support, etc.).

Figure 2:
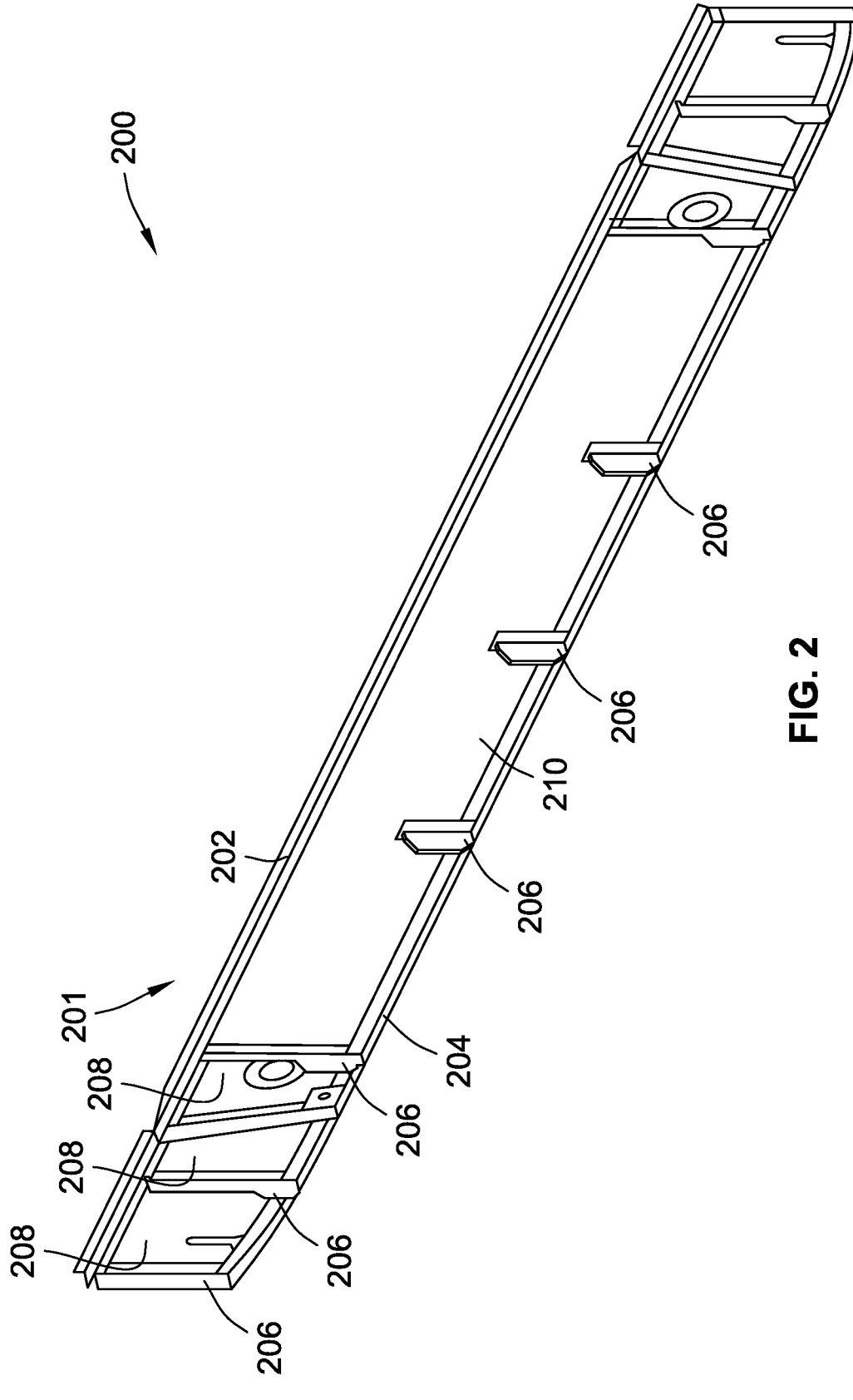
FIG. 2 is a cross-sectional slice view of a floorboard of the example aircraft of FIG. 1.

FIG. 2 is a cross-sectional slice view of a floorboard (e.g. a platform, a support platform, a floor assembly, etc.) 200 of the example aircraft 100 of FIG. 1. In this example, the floorboard 200 is implemented to support occupants and equipment/structures of the cabin 104. The example floorboard 200 includes a frame 201 having an upper frame portion (e.g., an upper support section, etc.) 202 and a lower frame portion (e.g., a lower support section, etc.) 204, stiffeners 206, beams (e.g., webs, secondary beams, etc.) 208, and a beam (e.g., a web, a primary beam, a main support, a wall, etc.) 210. According to examples disclosed herein, the beam 210 can be implemented with a stiffener, a stiffener component, a stiffener portion and/or a stiffener region that is utilized with another portion of the beam 210 having a reduced stiffness to enable the beam 210 to move and/or displace in a manner that facilitates energy absorption, as will be discussed in greater detail below in connection with FIGS. 3-7.

Figure 3:
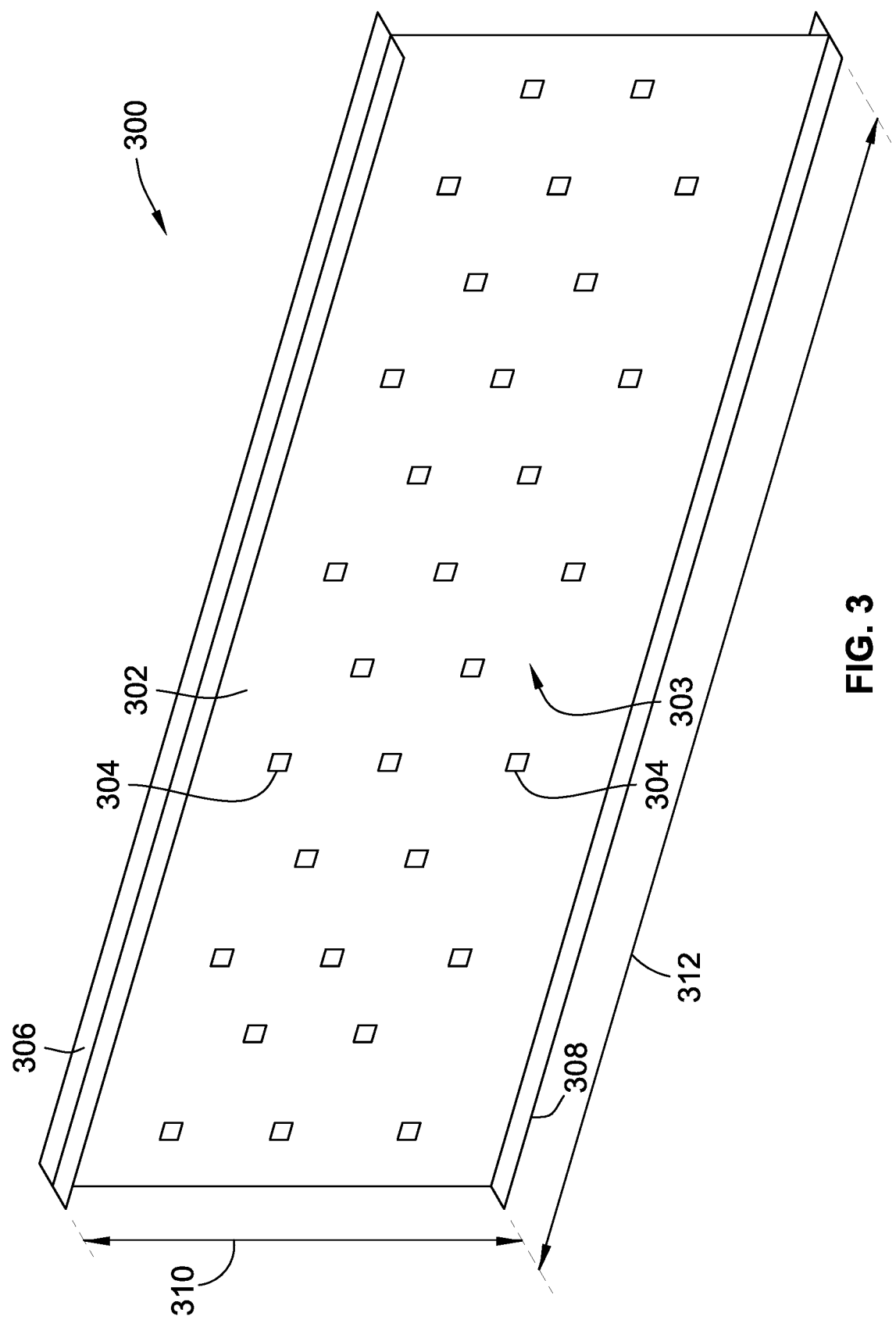
FIG. 3 is a perspective view of an example beam in accordance with teachings of this disclosure.

FIG. 3 is a perspective view of an example beam 300 in accordance with teachings of this disclosure. The example beam 300 can be implemented in the beam 210 and/or the beams 208 shown in FIG. 2. In the illustrated example of FIG. 3, the beam 300 includes a body (e.g., a main structure, a primary body, a wall, etc.) 302 with stiffeners (interstitial bodies, embedded stiffeners, stiffener pucks, stiffener tiles, stiffened regions, etc.) 304 arranged and/or interspersed (e.g., interstitially arranged, integral with, etc.) in a pattern 303 resembling a checkered pattern. Specifically, the example stiffeners 304 are interstitial bodies embedded in the body 302. Further, the body 302 extends between a flange 306 at a first lateral side of the body 302 to a flange 308 at a second lateral side of the body 302 and extend along a lateral direction, as generally indicated by a double arrow 310. Additionally, the example body 302 extends in a longitudinal direction generally indicated by a double arrow 312. In other examples, the stiffeners 304 are arranged in a scattered, irregular and/or random distribution. Additionally or alternatively, the stiffeners 304 are more densely arranged near portions, widths, sides and/or ends of the body 302.

To effect a modal displacement and/or movement of the beam 300, the aforementioned stiffeners 304 are placed, arranged, patterned and/or distributed in the body 302. In particular, the example stiffeners 304 extend along at least a portion of a longitudinal width of the body 302, and have a stiffness that is relatively higher in comparison to that of the body 302. As a result, the stiffeners 304 can affect a bending and/or modal displacement of the body 302 and/or the beam 300, thereby enabling the beam 300 to effectively dissipate forces and/or energy imparted thereto. In the context of the aircraft 100 shown in FIG. 1, forces and/or energy can be transferred to the occupant can be advantageously reduced. The example stiffeners 304 can be composed of a different material from that of the body 302 (e.g., the stiffeners 304 have a material with greater degree of stiffness and/or lower modulus of elasticity than material of the body 302). In some examples, the stiffeners 304 have a greater thickness than the body 302. Particularly, the stiffeners 304 and the body 302 are composed of the same material but the stiffeners 304 have a greater thickness than that of the body 302, for example. Additionally or alternatively, the stiffeners 304 are placed and coupled to the body 302 (e.g., placed into apertures of the body 302 and coupled/fused to the body 302).

In the illustrated example, the stiffeners 304 are arranged in rows along the lateral direction and columns along the longitudinal direction of the body 302. In this example, the stiffeners 304 positioned in the rows and the columns are spaced apart at substantially identical spacing therebetween (e.g., spacing within 10% of one another) in both horizontal and vertical directions (as viewed in FIG. 3). In other examples, the stiffeners 304 are spaced apart with varying and/or irregular distances to one another (e.g., the stiffeners 304 are more densely placed at a lateral end and/or a longitudinal end of the body 302). In some examples, some of the stiffeners 304 are not placed in the pattern 303 along the rows and/or the columns (e.g., some of the stiffeners 304 are not placed into the pattern 303) to vary bending, bending behavior, modal behavior and/or energy absorption charac- teristics of the beam 300.

In some examples, the body 302 includes and/or is integral with the flanges 306, 308. In other examples, the flanges 306, 308 are assembled to the body 302 or the flanges 306, 308 form part of a frame or other support structure of the aircraft 100 that attaches to the body 302. In some examples, the stiffeners 304 have varying shapes from one another. Additionally or alternatively, ones of the stiff- eners 304 have different sizes compared to one another (in contrast to ones of the stiffeners 304 each having an identical size).

While the stiffeners 304 of the illustrated example are generally depicted as being generally square-shaped, the stiffeners 304 can be any appropriate other shape including, but not limited to an oval, a circle, a diamond, a triangle, a rectangle, a hexagon, etc. In other examples, the stiffeners extend along a diagonal direction of the body 302. In some examples, the stiffeners 304 are arranged such that they are less densely placed near at least one longitudinal and/or lateral end of the body 302 (e.g., greater spacing near the at least one longitudinal and/or lateral end of the body 302). Alternatively, the stiffeners 304 are arranged such that they are more densely placed near at least one longitudinal and/or lateral end of the body 302. Additionally or alternatively, the stiffeners 304 vary in overall shape (e.g., square stiffeners in combination with circular stiffeners on the body 302).

Figure 4:
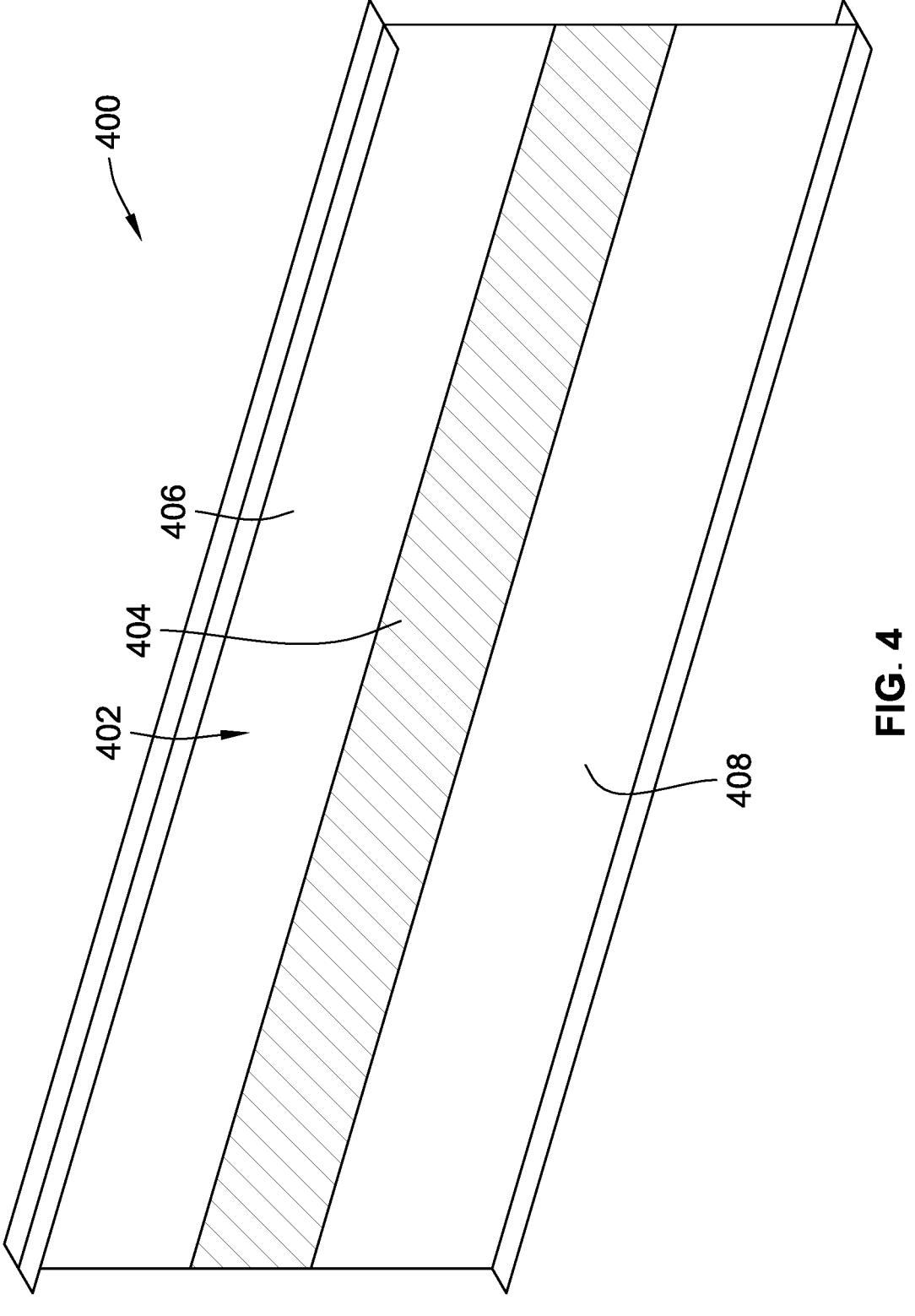
FIG. 4 is a perspective view of another example beam in accordance with teachings of this disclosure.

FIG. 4 is a perspective view of another example beam 400 in accordance with teachings of this disclosure. The example beam 400 can be implemented in the beam 210 and/or the beams 208 shown in FIG. 2, and is similar to the example beam 300 shown in FIG. 3 but, instead, includes a body 402 with a stiffener 404 extending across an entire longitudinal length of the body 402. In turn, the example stiffener 404 separates and/or subdivides the body 402 into portions (e.g., lateral portions, partial walls, etc.) 406, 408 of the body 402. In other words, the example stiffener 404 defines a medial portion of the body 402 and/or a wall of the body 402. According to examples disclosed herein, the stiffener 404 is composed of a material that is different from the body 402. Additionally or alternatively, the example stiffener 404 has a greater thickness than that of the body 402. The example stiffener 404 can be centered in a lateral direction of the body 402 or offset from a lateral center of the body 402. In other examples, the stiffener 404 extends diagonally across the body 402. Additionally or alternatively, the body 402 further includes interstitial/embedded stiffener bodies, such as the example stiffeners 304 shown in FIG. 3. In other examples, multiple ones of the stiffener 404 are placed across a lateral length of the body.

Figure 5:
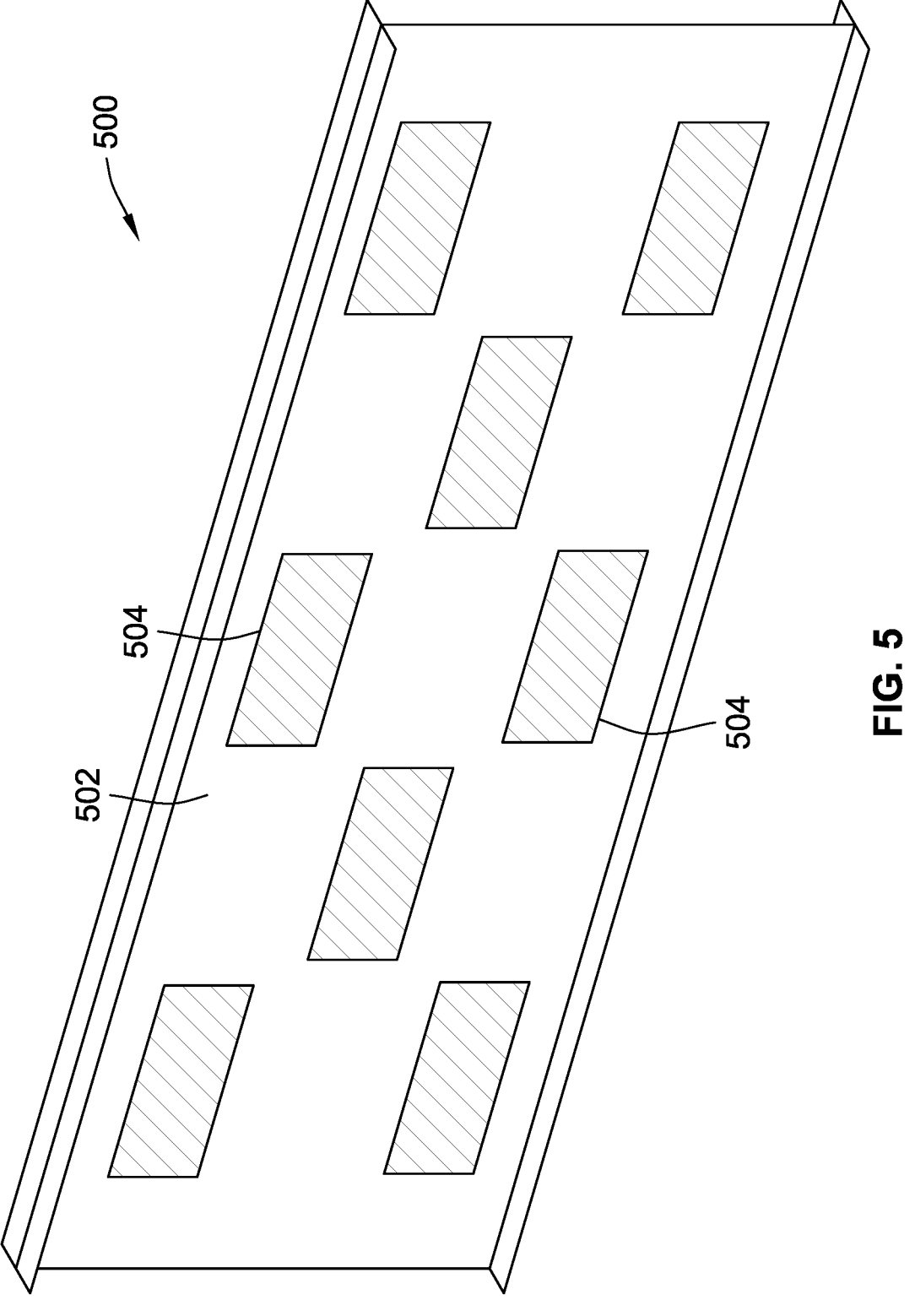
FIG. 5 is a perspective view of yet another example beam in accordance with teachings of this disclosure.

FIG. 5 is a perspective view of yet another example beam 500 in accordance with teachings of this disclosure. The example beam 500 includes a body 502 with a pattern of stiffeners 504 interspersed therein. In this example, the stiffeners 504 have a generally uniform width along a longitudinal direction. However, in other examples, widths of the stiffeners may vary (e.g., along a longitudinal direc- tion of the body 502, along a lateral direction of the body 502). In some examples, ones of the stiffeners 504 have a different cross-sectional profile and/or cross-sectional size/ dimensions from that of the body 502 (e.g., as viewed in the longitudinal or lateral directions). In some examples, the stiffeners 504 have an oval and/or ellipsoid shape (e.g., elongated along a longitudinal direction of the body 502).

Figure 6:
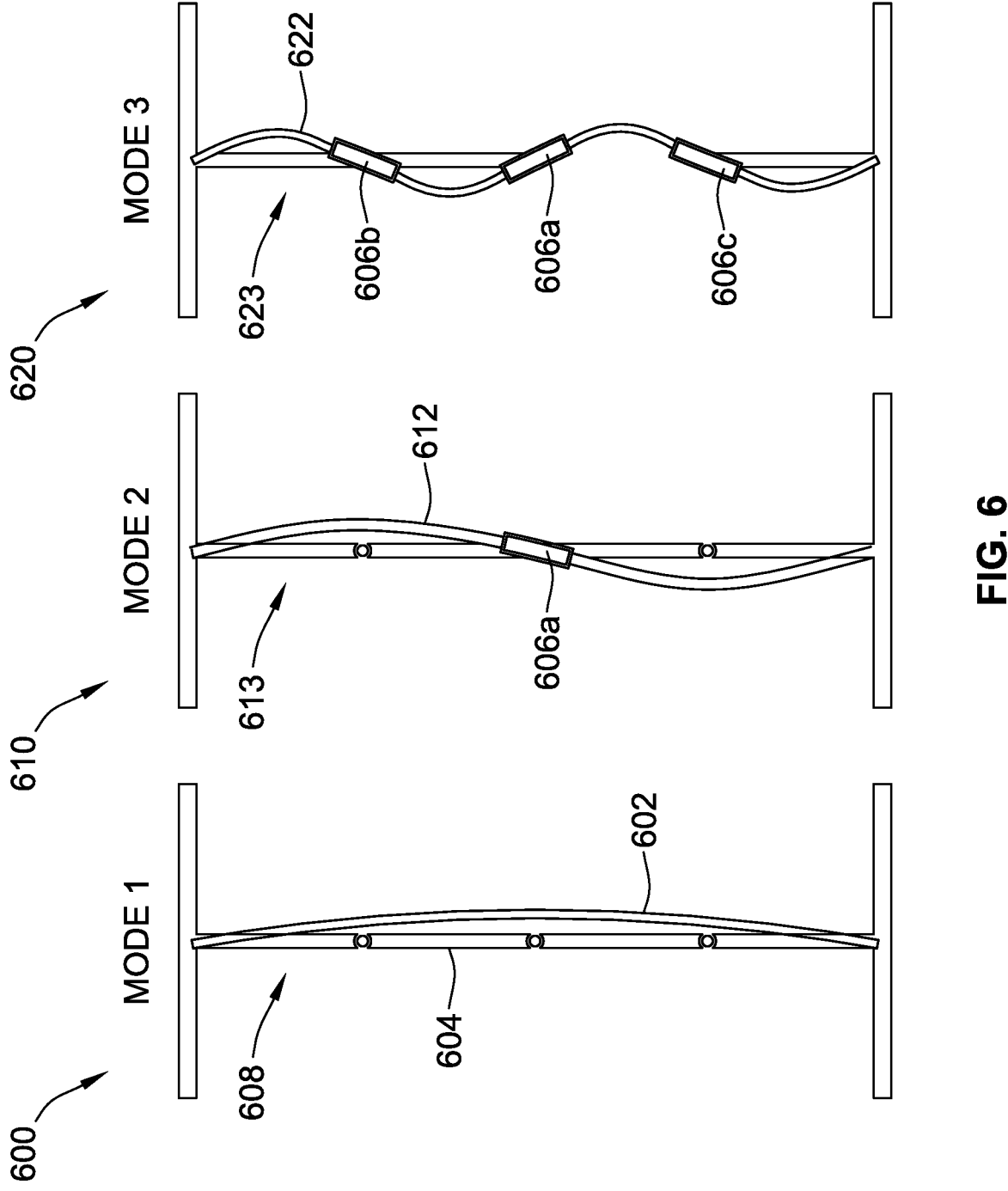
FIG. 6 illustrates utilization of examples disclosed herein.

FIG. 6 illustrates utilization of examples disclosed herein. In the illustrated example of FIG. 6, a first mode 600 is shown with a beam deflection 602 with respect to a neutral position 604. In this example, no stiffeners are positioned on a beam 608. Further, a second mode 610 is shown with a beam deflection 612 such that a stiffener 606, which is designated as a stiffener 606a in this example, is positioned at a mid-length location (or any other appropriate interme- diate length location) of a beam 613. The example stiffener 606a affects load dissipation and/or modal bending of the beam 613. In particular, the stiffener 606a may be placed within 10% of a lateral center of the beam 613, for example. In other examples, the stiffener 606a is not placed at or proximate the mid-length location of the beam 613. In the illustrated example of FIG. 6, a beam 623 is also shown in a third mode 620 affected by the aforementioned stiffener 606a with additional stiffeners 606b, 606c such that the stiffeners 606a, 606b, 606c are positioned at equal distances along the lateral length of the beam 623 and, thus, a beam deflection 622 depicts the beam 623 being subdivided into four equal length portions, for example. The addition of the stiffeners 606b, 606c enables increased energy and/or load dissipation in comparison with the modes 600, 610. As can be seen with the modes 600, 610, 620 of FIG. 6, example stiffeners disclosed herein can be utilized at positions of beams that might be subject to significant loads and/or stresses. Further, according to examples disclosed herein, stiffeners can be positioned at positions and/or lengths of a corresponding beam to adjust and/or affect bending modes of the beam.

Figure 7:
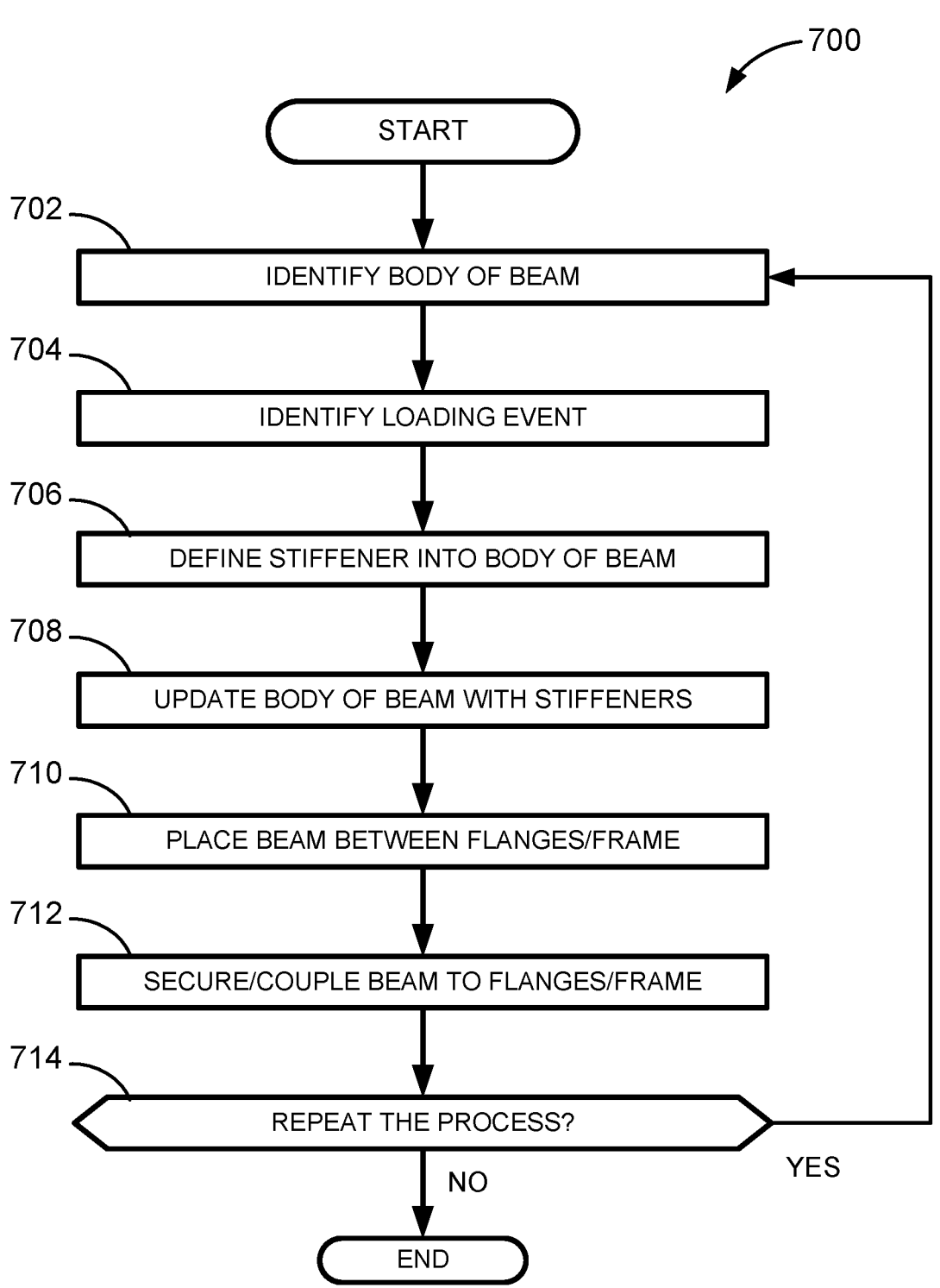
FIG. 7 is a flowchart representative of an example method to produce examples disclosed herein.

FIG. 7 is a flowchart representative of an example method 700 to produce examples disclosed herein. The example method 700 can be implemented to design, analyze, manu- facture and/or assemble (e.g., integrate) beams in accor- dance with teaching of this disclosure onto vehicles. Further, the example 700 can correspond to assembling and/or inte- grating the beams onto vehicles.

At block 702, a body (e.g., the body 302, the body 402, the body 502) of a beam is identified. In some examples, the body is identified based on determining loads that the body will be subjected to subsequent to integration (e.g., the body will be subject to certain loads based on an intended instal- lation with respect to a vehicle).

At block 704, a loading event and/or loading mode of the beam is identified. The loading event and/or the loading mode can be identified based on predicted use/implementation, empirical data, simulation data, calculated loads, etc. of the beam. In particular examples, the loading event can be characterized.

At block 706, according to examples disclosed herein, a stiffener (e.g., the stiffener 304, the stiffener 404, the stiffener 504, the stiffeners 606*a*, 606*b*, 606*c*) is defined onto the body. According to examples disclosed herein, the stiffener can be defined on the body and/or the beam based on the aforementioned loading event and/or to enable a pre-defined buckling mode of the beam that dissipates energy. In some examples, the stiffener is defined by changing (e.g., machining, thinning, etc.) a thickness of the body or the stiffener (e.g., the body is thinned, cut, trimmed, machined and/or polished in portions thereof to define the stiffener). In some examples, the stiffener is composed of a different material from the body. As mentioned above, in some examples, the stiffener is defined onto the body to induce a pre-defined buckling movement in the beam to increase an energy dissipation thereof.

At block 708, additionally or alternatively, the body is updated and/or provided with the stiffener. For example, the stiffener is coupled (e.g., welded, bonded, integrated, etc.) to the body. In some examples, the stiffener is placed into an aperture of the body. Accordingly, the stiffener can be placed onto the body based on the loading event.

At block 710, in some examples, the beam and/or the body is placed and/or positioned between flanges and/or a frame (e.g., of a support structure). According to some examples disclosed herein, the beam and/or the body is aligned relative to the flanges and/or the frame.

At block 712, in some examples, the beam and/or the body is secured and/or fastened to the flanges and/or the frame. In this example, the beam and/or the body is rigidly coupled to the flanges and/or the frame.

At block 714, it is determined whether to repeat the process. If the process is to be repeated (block 714), control of the process returns to block 702. Otherwise, the process ends. This determination may be based on whether additional beams with stiffeners are to be produced (e.g., in a manufacturing environment), whether additional beams are to be integrated onto an existing vehicle and/or an aircraft.

Figure 8:
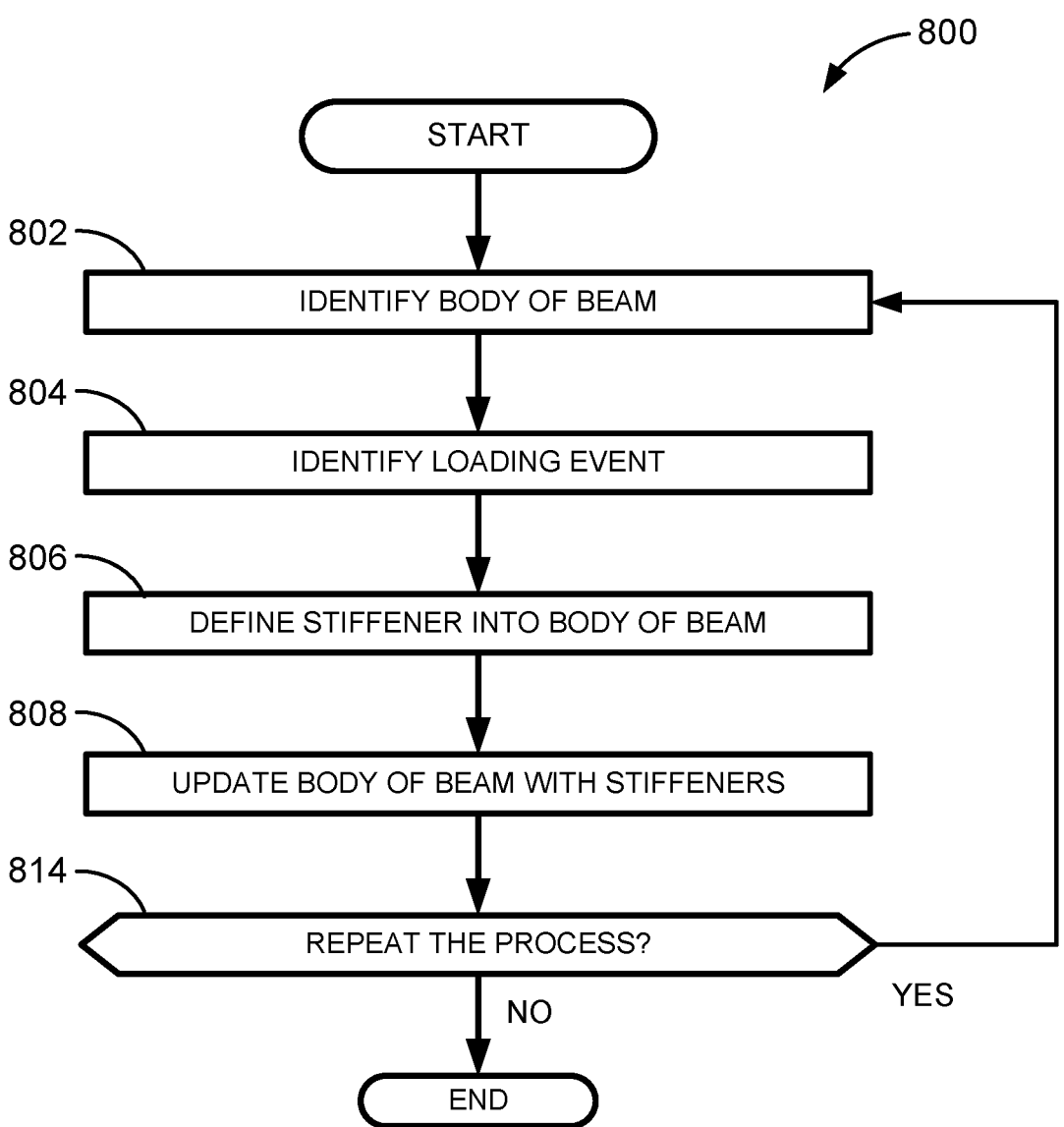
FIG. 8 is a flowchart representative of an example method to provide examples disclosed herein to existing structures.

FIG. 8 is a flowchart representative of an example method 800 to provide examples disclosed herein to existing structures and/or beams. The example method 800 is utilized for manufacturing/production or retrofitting examples disclosed herein onto existing vehicles.

At block 802, a body (e.g., the body 302, the body 402, the body 502) of an existing and/or installed beam is identified. For example, the body (e.g., already installed) can be located and/or identified on an existing and/or in-service vehicle. In other examples, the body can be associated with a beam that is being produced for upgrading a vehicle or a stationary structure, for example. In some examples, the installed body is identified based on determining that the body will be subject to loads (e.g., the body will be subject to increased loads compared to other bodies, the body will be subject to loads that exceed a load threshold).

At block 804, a loading event and/or loading mode of the beam is identified. The loading event and/or the loading mode can be identified based on empirical data, simulation data, calculated loads, etc. of the beam. In particular examples, the loading event can be characterized.

At block 806, according to some examples disclosed herein, a stiffener (e.g., the stiffener 304, the stiffener 404, the stiffener 504, the stiffeners 606*a*, 606*b*, 606*c*) is defined onto the existing and/or installed body. According to examples disclosed herein, the stiffener is defined by changing (e.g., machining, thinning, etc.) a thickness of the body or the stiffener (e.g., the body is thinned, cut, trimmed, machined and/or polished in portions thereof to define the stiffener). According to examples disclosed herein, the stiffener can be defined on the body while it is placed in its integrated position.

At block 808, in some examples, the body is updated and/or provided with the stiffener. For example, the stiffener is coupled (e.g., welded, bonded, integrated, etc.) to the body. According to examples disclosed herein, the body can be provided with the stiffener while the body is placed and/or installed between corresponding flanges and/or frames of a vehicle. Accordingly, the stiffener can be placed onto the body based on the loading event predicted or experienced with the vehicle. In some examples, the stiffener is composed of a different material from the body. Additionally or alternatively, the stiffener is placed into an aperture of the body.

At block 814, it is determined whether to repeat the process. If the process is to be repeated (block 814), control of the process returns to block 802. Otherwise, the process ends. This determination may be based on whether additional beams with stiffeners are to be updated and/or retrofitted (e.g., in a servicing/maintenance/update environment), whether additional existing and/or installed beams are to be retrofitted/updated with stiffeners.

Example methods, apparatus, systems, and articles of manufacture to enable effective energy absorption of structures are disclosed herein. Further examples and combinations thereof include the following:

Example 1 includes an apparatus to introduce a predefined buckling mode in a beam for energy absorption in a vehicle, the apparatus comprising a body of the beam, the body extending along a lateral direction thereof between a first flange at a first lateral side of the beam and a second flange at a second lateral side of the beam, and a stiffener interstitially placed in the body, the stiffener positioned between the first and second lateral sides, the stiffener extending across at least a portion of a longitudinal direction of the body.

Example 2 includes the apparatus as defined in example 1, wherein the stiffener includes interstitial bodies added to the body, the interstitial bodies extending across a portion of the longitudinal direction.

Example 3 includes the apparatus as defined in example 2, wherein the interstitial bodies are arranged in rows along the lateral direction.

Example 4 includes the apparatus as defined in example 3, wherein the interstitial bodies are arranged in columns along the longitudinal direction.

Example 5 includes the apparatus as defined in any of examples 1 to 4, wherein the body includes a first material and the stiffener includes a second material different from the first material.

Example 6 includes the apparatus as defined in any of examples 1 to 5, wherein the stiffener defines an interface that subdivides the body into first and second lateral portions.

Example 7 includes the apparatus as defined in any of examples 1 to 4 or 6, wherein the body and the stiffener are unitary.

Example 8 includes the apparatus as defined in example 7, wherein the stiffener has a greater thickness than that of the body.

Example 9 includes a support platform for use with a vehicle, the support platform comprising a first frame portion, a second frame portion, a beam extending between the first and second frame portions, and a stiffener integral with a wall of the beam, the stiffener extending across at least a portion of a longitudinal direction of the wall to introduce a predefined buckling mode in the beam.

Example 10 includes the platform as defined in example 9, wherein the wall includes interstitial bodies embedded therein, the interstitial bodies spaced apart in a pattern along the wall.

Example 11 includes the platform as defined in example 10, wherein the interstitial bodies are arranged in columns along the longitudinal direction.

Example 12 includes the platform as defined in example 11, wherein the interstitial bodies are arranged in rows along a lateral direction of the wall.

Example 13 includes the platform as defined in any of examples 9 to 12, wherein the wall includes a first material and the stiffener includes a second material different from the first material.

Example 14 includes the platform as defined in example 9 wherein the stiffener extends across an entirety of the longitudinal direction of the wall.

Example 15 includes the platform as defined in any of examples 9 to 12 or 14, wherein the wall and the stiffener are unitary.

Example 16 includes the platform as defined in example 15, wherein the stiffener has a greater thickness than that of the wall.

Example 17 includes a method to introduce a pre-defined buckling mode in a beam for energy absorption, the method comprising defining or placing a stiffener into or onto a body of the beam, the stiffener extending across at least a portion of a longitudinal direction of the body, and positioning the body to laterally extend between at least one of (i) a first flange and a second flange, or (ii) a first frame portion and a second frame portion.

Example 18 includes the method as defined in example 17, further including securing the beam to a frame of a vehicle.

Example 19 includes the method as defined in any of examples 17 or 18, wherein defining or placing the stiffener onto the body includes thinning a first portion of the body such that a second portion of the body that is not thinned defines the stiffener.

Example 20 includes the method as defined in any of examples 17 to 19, wherein defining or placing the stiffener onto the body includes placing the stiffener into an aperture of the body.

From the foregoing, it will be appreciated that example systems, apparatus, articles of manufacture, and methods have been disclosed that enable increased energy dissipation with supports in vehicles. Examples disclosed herein can also enable cost-effective and relatively quick manufacturing of energy dissipation structures.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to introduce a predefined buckling mode in a beam for energy absorption in a vehicle, the apparatus comprising:

a body of the beam, the body extending along a lateral direction thereof between a first lateral side of the beam and a second lateral side of the beam; and a stiffener interstitially placed in the body, the stiffener having interstitial bodies that are integral with the body and positioned between the first and second lateral sides, the interstitial bodies extending across a longitudinal direction of the body such that the interstitial bodies are arranged in a checkered pattern across the longitudinal direction.

2. The apparatus as defined in claim 1, wherein the body includes a first material and the stiffener includes a second material different from the first material.

3. The apparatus as defined in claim 1, wherein the stiffener defines an interface that subdivides the body into first and second lateral portions.

4. The apparatus as defined in claim 1, wherein the body and the stiffener are unitary and form a continuous body.

5. The apparatus as defined in claim 4, wherein the stiffener has a greater thickness than that of the body.

6. The apparatus as defined in claim 1, wherein the interstitial bodies exhibit a rectangular shape.

7. The apparatus as defined in claim 1, wherein interstitial bodies extend along an entirety of a length between the first and second lateral sides.

8. The apparatus as defined in claim 1, including flanges at opposing vertical sides of the beam.

9. The apparatus as defined in claim 1, wherein the interstitial bodies have uniform distances therebetween.

10. The apparatus as defined in claim 1, wherein the interstitial bodies have an oval shape, a circular shape, a diamond shape, a triangular shape or a hexagonal shape.

11. The apparatus as defined in claim 1, wherein the beam is for an aircraft frame.

12. A support platform for use with a vehicle, the support platform comprising:

a first frame portion;

a second frame portion;

a beam extending between the first and second frame portions; and a stiffener including interstitial bodies that are integral with a wall of the beam, the stiffener interstitial bodies extending across at least a portion of a longitudinal direction of the wall in a checkered pattern to introduce a predefined buckling mode in the beam.

13. The platform as defined in claim 12, wherein the wall includes a first material and the stiffener includes a second material different from the first material.

14. The platform as defined in claim 12, wherein the stiffener extends across an entirety of the longitudinal direction of the wall.

15. The platform as defined in claim 12, wherein the wall and the stiffener are unitary.

16. The platform as defined in claim 15, wherein the stiffener has a greater thickness than that of the wall.

17. A method to introduce a pre-defined buckling mode in a beam for energy absorption, the method comprising:

defining or placing a stiffener into or onto a body of the beam, the stiffener including interstitial bodies extending across at least a portion of a longitudinal length of the body in a checkered pattern; and positioning the body to laterally extend between at least one of:

(i) a first flange and a second flange, or (ii) a first frame portion and a second frame portion.

18. The method as defined in claim 17, further including securing the beam to a frame of a vehicle.

19. The method as defined in claim 17, wherein defining or placing the stiffener onto the body includes thinning a first portion of the body such that a second portion of the body that is not thinned defines the stiffener.

20. The method as defined in claim 17, wherein defining or placing the stiffener onto the body includes placing the stiffener into an aperture of the body.

* * * * *